(12) United States Patent
Chiang et al.

(10) Patent No.: US 8,595,543 B2
(45) Date of Patent: *Nov. 26, 2013

(54) METHOD AND CIRCUIT FOR TRIMMING AN INTERNAL OSCILLATOR OF A USB DEVICE ACCORDING TO A COUNTING NUMBER BETWEEN A FIRST AND SECOND CLOCK COUNT VALUE

(75) Inventors: Tsung-Yin Chiang, Chiayi County (TW); Chun-Chi Wang, Nantou County (TW); Po-Hao Wu, Hsinchu County (TW); Chun-An Tang, Hsinchu County (TW)

(73) Assignee: Elan Microelectronics Corporation, Hsinchu (TW)

( * ) Notice: Subject to any disclaimer, the term of this patent is extended or adjusted under 35 U.S.C. 154(b) by 292 days.

This patent is subject to a terminal disclaimer.

(21) Appl. No.: 12/889,794

(22) Filed: Sep. 24, 2010

(65) Prior Publication Data

US 2011/0093736 A1 Apr. 21, 2011

(30) Foreign Application Priority Data

Oct. 16, 2009 (TW) .............................. 098135121 A (51) Int. Cl.
*G06F 1/00* (2006.01)
*G06F 1/12* (2006.01)
*H04L 25/64* (2006.01)

(52) U.S. Cl.
USPC ........... 713/502; 327/299; 327/160; 327/165; 713/503; 713/400; 713/500; 375/371; 375/215

(58) Field of Classification Search
USPC ........... 713/500, 400; 375/371, 215; 327/165, 327/160; 331/1, 44; 710/74; 381/77
See application file for complete search history.

(56) References Cited

U.S. PATENT DOCUMENTS

| | | | | |
|---|---|---|---|---|
| 5,487,084 A * | 1/1996 | Lindholm | ...................... | 375/215 |
| 5,818,948 A * | 10/1998 | Gulick | ............... | 381/77 |
| 6,061,802 A * | 5/2000 | Gulick | ............... | 713/400 |
| 6,092,210 A * | 7/2000 | Larky et al. | ................... | 713/400 |
| 6,343,364 B1 * | 1/2002 | Leydier et al. | ................ | 713/500 |
| 6,407,641 B1 * | 6/2002 | Williams et al. | ............... | 331/1 A |
| 6,633,933 B1 * | 10/2003 | Smith et al. | ...................... | 710/74 |
| 6,762,635 B2 * | 7/2004 | Bruhnke et al. | .............. | 327/160 |
| 7,093,151 B1 * | 8/2006 | Williams | ..................... | 713/500 |
| 7,873,858 B2 * | 1/2011 | Sung et al. | ..................... | 713/500 |
| 8,140,882 B2 * | 3/2012 | Lee et al. | ..................... | 713/400 |
| 2001/0011914 A1 * | 8/2001 | Pomet | .......................... | 327/165 |
| 2001/0020857 A1 * | 9/2001 | Malherbe et al. | ............. | 327/165 |
| 2006/0023824 A1 * | 2/2006 | Greco et al. | .................. | 375/371 |
| 2007/0159221 A1 | 7/2007 | Ma et al. | | |
| 2009/0284298 A1 * | 11/2009 | Liu | ............... | 327/299 |
| 2010/0122106 A1 * | 5/2010 | Lee et al. | ..................... | 713/503 |

* cited by examiner

FOREIGN PATENT DOCUMENTS

TW I250442 B 3/2006

OTHER PUBLICATIONS

Communication From Taiwan Patent Office Regarding a Counterpart Foreign Application Dated Taiwan Year 102(2013)-Mar. 20.

*Primary Examiner* — Thomas Lee
*Assistant Examiner* — Aurel Prifti
(74) *Attorney, Agent, or Firm* — Rosenberg, Klein & Lee (57) ABSTRACT

A circuit and method for trimming an internal oscillator of a USB device that generates a clock signal as a frequency source of the USB device detect an end of packet from an input data stream to initialize a counter, identify a token packet in the data stream to detect a start of frame token packet for the counter to carry out clock counting on the clock signal to thereby obtain a count value, and compare the count value with a reference value to determine a trimming code for trimming a clock frequency of the internal oscillator.

26 Claims, 7 Drawing Sheets

Fig. 1
Prior art

| Token packet | Synchronization sequence (SYNC) | Packet identifier (PID) | Address (ADDR) | Endpoint (ENDP) | Cycle redundancy check (CRC) |
|---|---|---|---|---|---|
| 14 | 8 bits | 8 bits | 7 bits | 4 bits | 5 bits |

| Data packet | Synchronization sequence (SYNC) | Packet identifier (PID) | Data (DATA) | Cycle redundancy check (CRC) |
|---|---|---|---|---|
| 16 | 8 bits | 8 bits | 0~8184 bits | 16 bits |

| Hankshake packet | Synchronization sequence (SYNC) | Packet identifier (PID) |
|---|---|---|
| 18 | 8 bits | 8 bits |

METHOD AND CIRCUIT FOR TRIMMING AN INTERNAL OSCILLATOR OF A USB DEVICE ACCORDING TO A COUNTING NUMBER BETWEEN A FIRST AND SECOND CLOCK COUNT VALUE

FIELD OF THE INVENTION

The present invention is related generally to a universal serial bus (USB) device and, more particularly, to a method and circuit for trimming an internal oscillator of a USB device.

BACKGROUND OF THE INVENTION

In USB 2.0 and 1.1 driver protocols, there are strict regulations for the operation frequencies of low-speed, full-speed, and high-speed communication interfaces between USB hosts and USB devices for satisfying various applications. For example, the data rate specification of data streams in low-speed USB hosts is 1.5 MHz±1.5%, for keyboards, mice and so on, in full-speed USB hosts is 12 MHz±0.25%, for audio applications and microphones, and in high-speed hosts is 480 MHz±0.05%, for video applications and imaging. Conventionally, as a frequency source of a USB device, a crystal oscillator or a resonant oscillator, optionally with a digital phase lock loop (PLL), is used to generate an accurate frequency signal. However, this approach is impossible to allow the frequency source integrated into the integrated circuit (IC) of the USB device.

For the purposes of reducing costs and enhancing consistence among elements, the IC of a USB device is integrated with resistors and capacitors that establish an internal RC oscillator as the frequency source of the USB device. However, due to process variation, the RC oscillator generates frequency with a potential error up to ±25%, failing to meet the regulations of the USB driver protocols.

Figure 1:
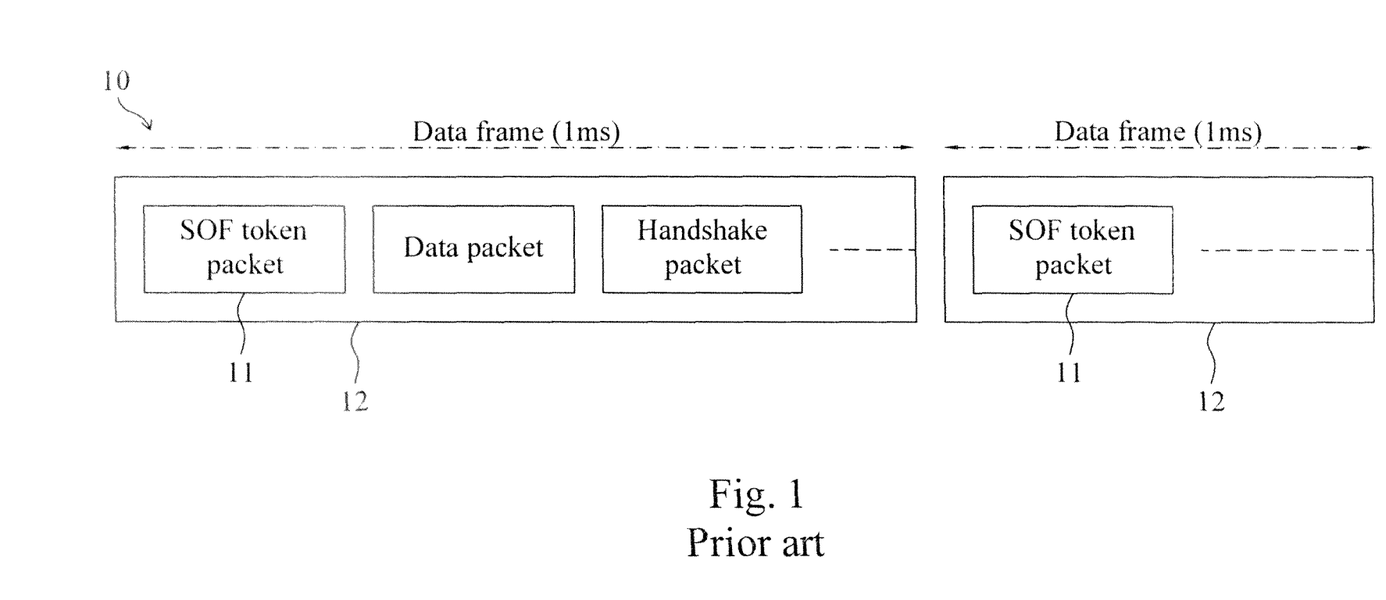
FIG. 1 is a simplified diagram showing the data stream of a USB host.
Figure 2:
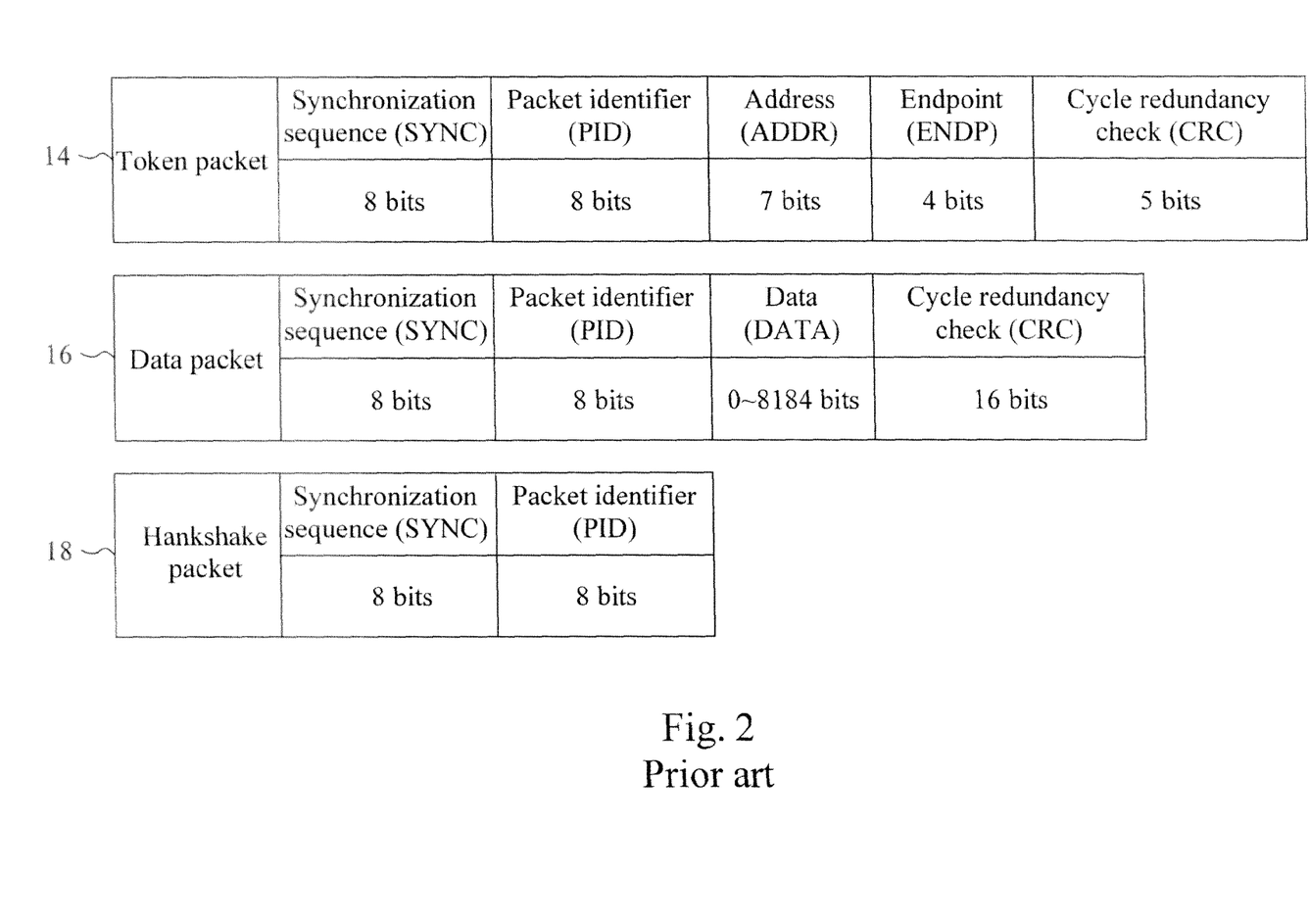
FIG. 2 is a simplified diagram showing the packet format regulation of the USB interface communication protocol.

Strict regulations are provided in the USB interface communication protocols for the formats of output packets in the data streams of a USB host. As shown in FIGS. 1 and 2, when a USB interface communicates in full-speed, the data stream 10 output from a USB host consists of a plurality of data frames 12, each of which has a temporal length of 1 ms and includes a plurality of packets, for example, a token packet 14, a data packet 16 and a handshake packet 18. Further, each data frame 12 includes a start of frame (SOF) token packet 11 as a starting point of itself and hence, the time interval between two adjacent SOF token packets 11 is 1 ms. Moreover, a token packet 14 has a fixed bits period of 32 bits, a data packet 16 has a bits period of less than 8,216 bits, and a handshake packet 18 has a fixed bits period of 16 bits. Each of the token packet 14, data packet 16, and handshake packet 18 has a synchronization sequence (SYNC) field with a fixed bits period of 8 bits and a fixed bit value, and a packet identifier (PID) field with a fixed bits period and a variable bit value. Thus, the properties of the data frame 12, token packet 14, data packet 16, and handshake packet 18 in a data stream output from a USB host can be used to acquire a signal length of the data stream of the USB host as a trimming base for the frequency of an RC oscillator inside a USB device to trim the internal RC oscillator of the USB device, so as to meet the frequency accuracy of the USB driver protocols and synchronize the USB device and the data stream signals of the USB host.

In U.S. Pat. No. 7,453,958, the frequency of an internal oscillator of a USB device is coarsely tuned by virtue of the property that a synchronization sequence field has a fixed bits period and then fine-tuned by virtue of the property that the time interval between two adjacent SOF token packets 11 is 1 ms. Thus, via digital-to-analog conversion (DAC) in the coarse-tuning and fine-tuning steps, the frequency of an internal oscillator of a USB device is trimmed and becomes accurate with respect to the data stream of a USB host. However, as this two-step trimming process (i.e., coarse-tuning followed by fine-tuning) relies on the first data frame in the data stream of the USB host for coarse-tuning and the second and third data frames in the data stream of the USB host for fine-tuning, not only is the trimming time relatively long (about the time period of three data frames), but also is required a relatively complicated circuit.

SUMMARY OF THE INVENTION

An object of the present invention is to provide a method and circuit for trimming an internal oscillator of a USB device with a shorter trimming time.

Another object of the present invention is to provide a method and circuit for trimming an internal oscillator of a USB device with a simplified trimming circuit.

According to the present invention, a method for trimming an internal oscillator of a USB device that generates a clock signal as a frequency source of the USB device includes detecting an end of packet from an input data stream to initialize a counter, identifying a token packet in the data stream to detect a SOF token packet for controlling the counter to carry out clock counting on the clock signal to thereby obtain a count value, and comparing the count value with a reference value to determine a trimming code for trimming a clock frequency of the internal oscillator.

Preferably, a phase lock loop is used to multiply the clock frequency of the internal oscillator before the counter carries out clock counting.

By identifying a token packet and then accurately detecting a SOF token packet, the clock frequency of a USB device can be accurately trimmed in a single step, thereby reducing the trimming time and simplifying the trimming circuit.

BRIEF DESCRIPTION OF THE DRAWING

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
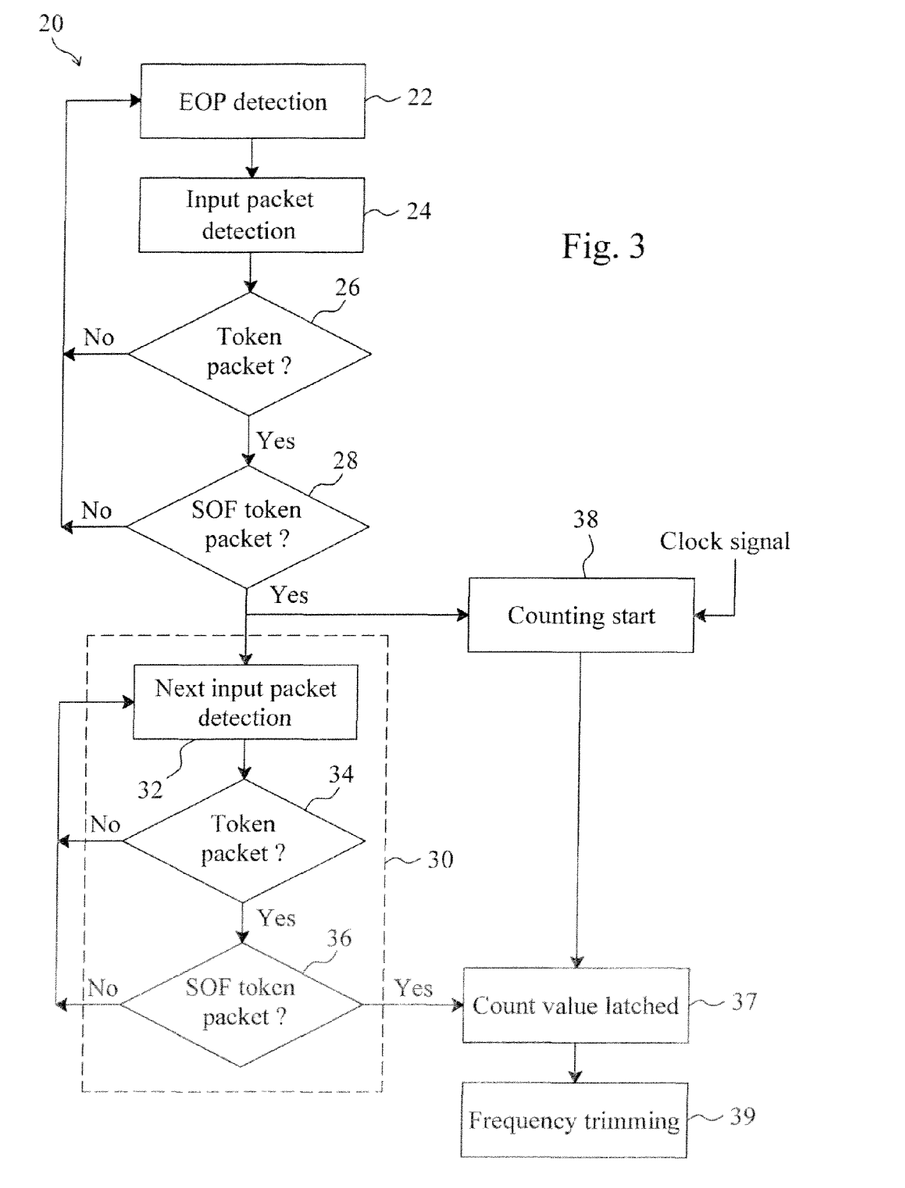
FIG. 3 is a flowchart of a first embodiment method according to the present invention.
Figure 4:
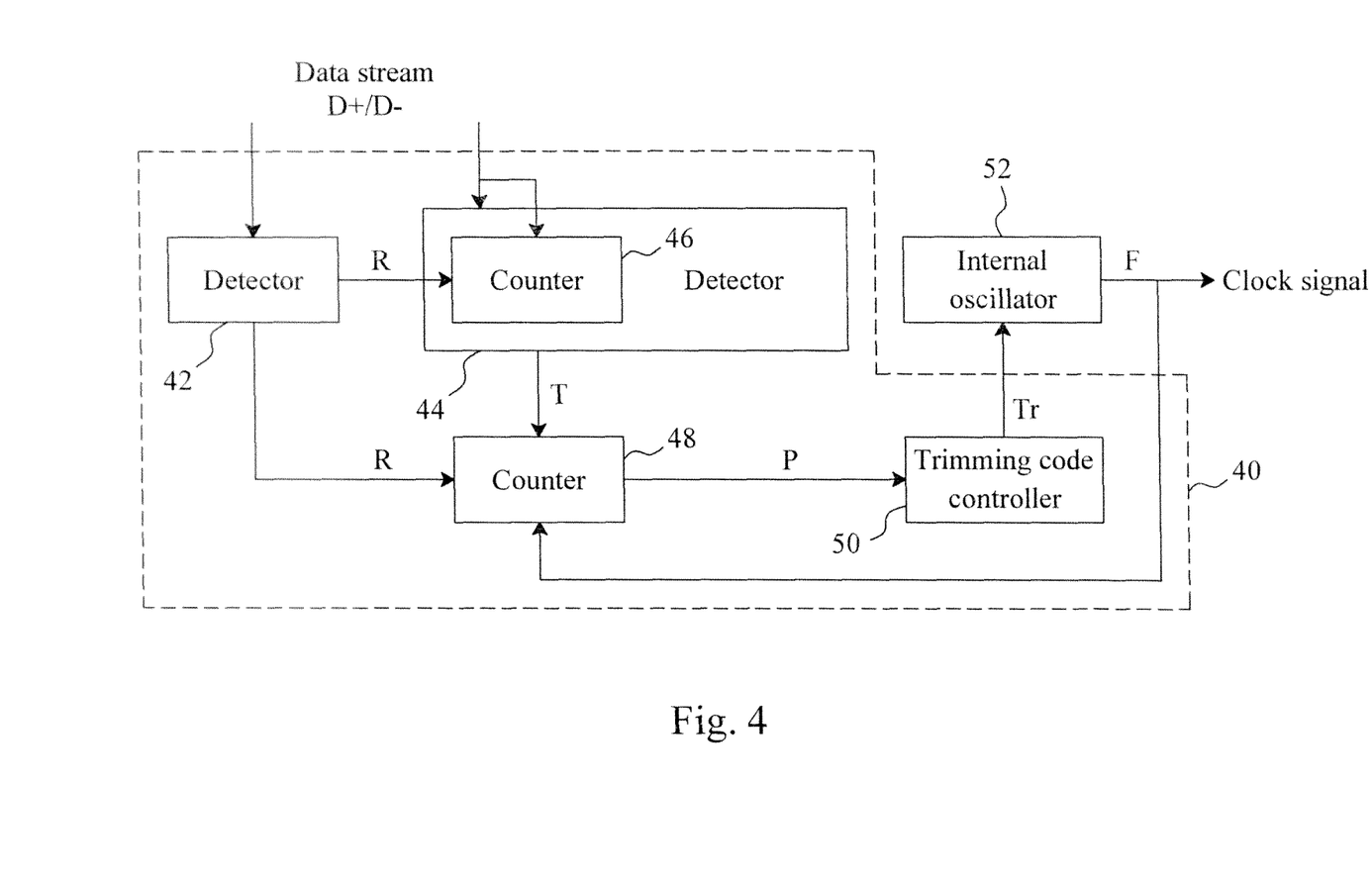
FIG. 4 is a circuit diagram of a first embodiment according to the present invention.

According to a first embodiment of the present invention, FIGS. 3 and 4 are flowchart 20 and circuit diagram 40, respectively. Referring to FIGS. 1 to 4, in step 22, a detector 42 detects an end of packet (EOP) in a data stream from a USB host, which is between the end of a packet and the beginning of the next packet in the data stream, to generate a reset signal R to initialize counters 46 and 48, thereby resetting the count value of the counters 46 and 48 to zero. In step 24, a detector 44 detects an input packet in the data stream of the USB host. In step 26, the detector 44 identifies whether or not the input packet is a token packet according to the synchronization sequences (SYNC) of the input packet. If the input packet is not a token packet, the process goes back to step 22; otherwise, the process goes to step 28. In step 28, the detector 44 identifies whether or not the input packet is a SOF token packet according to the packet identifier (PID) of the input packet. If the input packet is not a SOF token packet, the process goes back to step 22; otherwise, the detector 44 generates a counting signal T for the counter 48 and the process goes to steps 30 and 38. In step 38, the counter 48, in response to the counting signal T, carries out clock counting on the clock signal produced by an internal oscillator 52. In step 30, the detector 44 detects the next SOF token packet in the data stream of the USB host to turn off the counting signal T. In step 37, in response to turn-off of the counting signal T, the counter 48 is latched to obtain a count value $$P = F \times t, \quad [\text{Eq-1}]$$

where t is the time interval between two adjacent SOF token packets, and F is the clock frequency of the internal oscillator 52. In step 39, a trimming code controller 50 compares the count value P with a reference value K to determine a trimming code and generates a trimming signal Tr accordingly to trim the internal oscillator 52. The clock frequency F will be decreased when the count value P is greater than the reference value K, and the clock frequency F will be increased if the count value P is smaller than the reference value K, such that the count value P will be equal to the reference value K. The reference value K is derived from the designed frequency F' of the internal oscillator 52 and by substituting the designed frequency F' into the equation Eq-1, can be determined as $$K = F' \times t. \quad [\text{Eq-2}]$$

Since the SOP token packet is a characteristic packet in each data frame in full-speed USB applications, and each data frame has a temporal period of 1 ms, the time interval between two adjacent SOF token packets is 1 ms. If the designed frequency F' is 24 MHz, according to the equation Eq-2, the reference value K can be derived as $K = 24 \times 10^6 \times 10^{-3} = 24,000$. However, there is inaccuracy between the real frequency F''' and the designed frequency F' for the internal oscillator 52. According to the equation Eq-1, it can be derived that the count value P generated by the counter 48 is $P = F''' \times 10^{-3}$. Through comparing the count value P with the reference value K, when the count value P is greater than the reference value K, it is indicated that the real frequency F''' is higher than the designed frequency F', so that the trimming code controller 50 will trim the internal oscillator 52 to decrease its clock frequency F by the trimming signal Tr; when the count value P is smaller than the reference value K, it means that the real frequency F''' is lower than the designed frequency F', so that the trimming code controller 50 will trim the internal oscillator 52 to increase its clock frequency F by the trimming signal Tr; and when the count value P is equal to the reference value K, it suggests that the real frequency F''' is equal to the designed frequency F', so that the trimming code controller 50 will not trim the internal oscillator 52 and the clock frequency F is maintained.

In one embodiment, step 30 includes steps 32, 34, and 36. In step 32, the detector 44 detects the next input packet in the data stream of the USB host. In step 34, the detector 44 identifies whether or not the next input packet is a token packet according to the synchronization sequences SYNC of the next input packet. If the next input packet is not a token packet, the process goes back to step 32; otherwise, the process goes to step 36. In step 36, the detector 44 identifies whether or not the next input packet is a SOF token packet according to the PID of the next input packet. If the next input packet is not a SOF token packet, the process goes back to step 32; otherwise, the detector 44 turns off the counting signal T.

Figure 5:
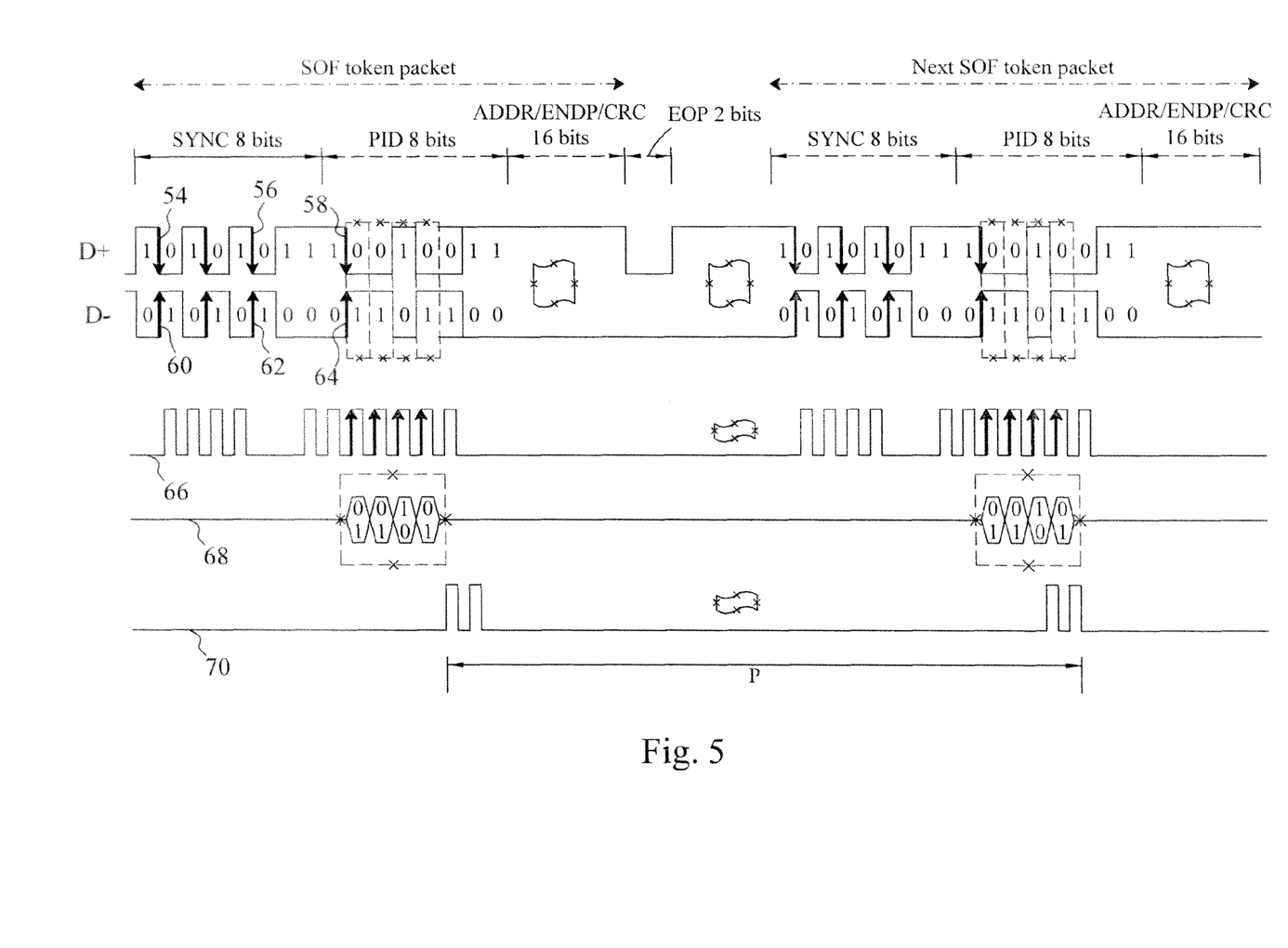
FIG. 5 is a waveform diagram in the process for trimming an internal oscillator of a USB device shown in FIGS. 2 and 3.

FIG. 5 is a waveform diagram in a process for trimming the internal oscillator 52. Referring to FIGS. 4 and 5, in one embodiment, the data stream from a USB host is carried by a differential pair of positive signal D+ and negative signal D−, and the internal oscillator 52 includes a controllable RC oscillator with a designed frequency F'. When the USB host transmits the data stream to the USB device, the detector 42 detects an EOP in the data stream to generate a reset signal R to initialize the counters 46 and 48, and afterward the detector 44 detects an input packet and identifies whether or not the input packet is a SOF token packet. More specifically, the detector 44 identifies whether or not the input packet is a token packet according to the synchronization sequences SYNC of the input packet. For instance, the counter 46 counts the number of clocks I1 in the clock signal generated by the internal oscillator 52 during the interval between the first falling edge 54 and the third falling edge 56 of the negative differential signal D− and the number of clocks I2 in the clock signal generated by the internal oscillator 52 during the interval between the first falling edge 54 and the fourth falling edge 58 of the negative differential signal D−. If the number of clocks I1 is one-half of the number of clocks I2, it is concluded that the input packet is a token packet. After the input packet is identified as a token packet, the clock signal 70 is used to latch the first to fourth bits following the fourth falling edge 58, as shown by waveform 66, to generate a packet identifier 68. If the negative differential signal D− is "0010" in the packet identifier 68, it is further concluded that the input packet is a SOF token packet. As soon as the input packet is identified as a SOF token packet, the detector 44 turns on the counting signal T, and the counter 48 stars to count the number of the clocks in the clock signal 70 accordingly. Then, the detector 44 continues to detect the next input packet and identifies whether or not the next input packet is a SOF token packet, and the counter 48 continues clock counting until the detector 44 detects a SOF token packet again and turns off the counting signal T. In response to turn-off of the counting signal T, the counter 48 is latched to obtain a count value P. After that, the trimming code controller 50 compares the count value P with a reference value K to adjust the clock frequency Alternatively, the positive differential signal D+ can also be used to identify whether or not the input packet is a SOF token packet. In that case, the counter 46 counts the number of clocks I3 in the clock signal generated by the internal oscillator 52 during the interval between the first rising edge 60 and the third rising edge 62 of the positive differential signal D+ and the number of clocks I4 in the clock signal generated by the internal oscillator 52 during the interval between the first rising edge 60 and the fourth rising edge 64 of the positive differential signal D+. If the number of clocks I3 is one-half of the number of clocks I4, it is concluded that the input packet is a token packet. After the input packet is identified as a token packet, the clock signal 70 is used to latch the first to fourth bits following the fourth rising edge 64, as shown by waveform 66, to generate a packet identifier 68. If the positive differential signal D+ is "1101" in the packet identifier 68, it can be further concluded that the input packet is a SOF token packet.

If the internal oscillator 52 is an RC oscillator, there is inaccuracy up to ±25% on the clock frequency F' of the RC oscillator due to process variation, and an input packet may be mistakenly identified as a SOF token packet if the first to fourth bits following the fourth falling edge of the negative differential signal D− or the fourth rising edge of the positive differential signal D+ are directly extracted as the packet identifier for identifying a SOF token packet because the packet identifier may contain an error bit. In this embodiment, however, only after the input packet is identified as a token packet, the first to fourth bits following the fourth falling edge of the negative differential signal D− or the fourth rising edge of the positive differential signal D+ are extracted as the packet identifier for identifying a SOF token packet. Thus, misidentification resulted from the inaccuracy of the clock frequency of the RC oscillator is prevented to allow correct identification of a SOF token packet.

In this embodiment, the detector 44 first identifies an input packet as a token packet according to the synchronization sequences SYNC of the input packet and then further identifies the input packet as a SOF token packet according to the PID of the input packet. Thus, the trimming process is completed in a single step to accurately trim the frequency source of the USB device without need to divide the trimming process into a coarse-tuning step and a fine-tuning step. Hence, the circuit is simplified and the cost is reduced. Moreover, each trimming takes the time of only two data frames, the trimming time is shortened.

Figure 6:
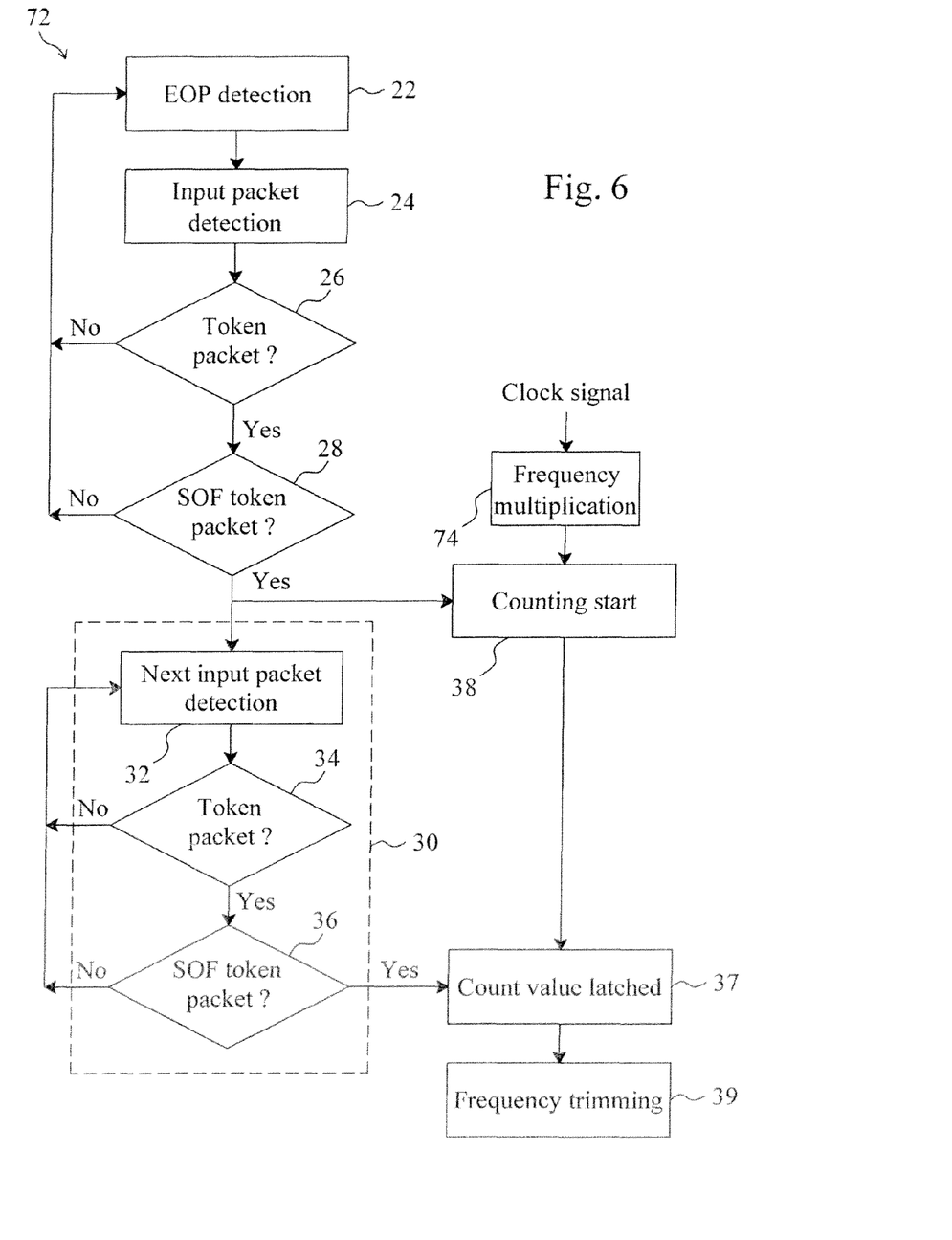
FIG. 6 is a flowchart of a second embodiment method according to the present invention.
Figure 7:
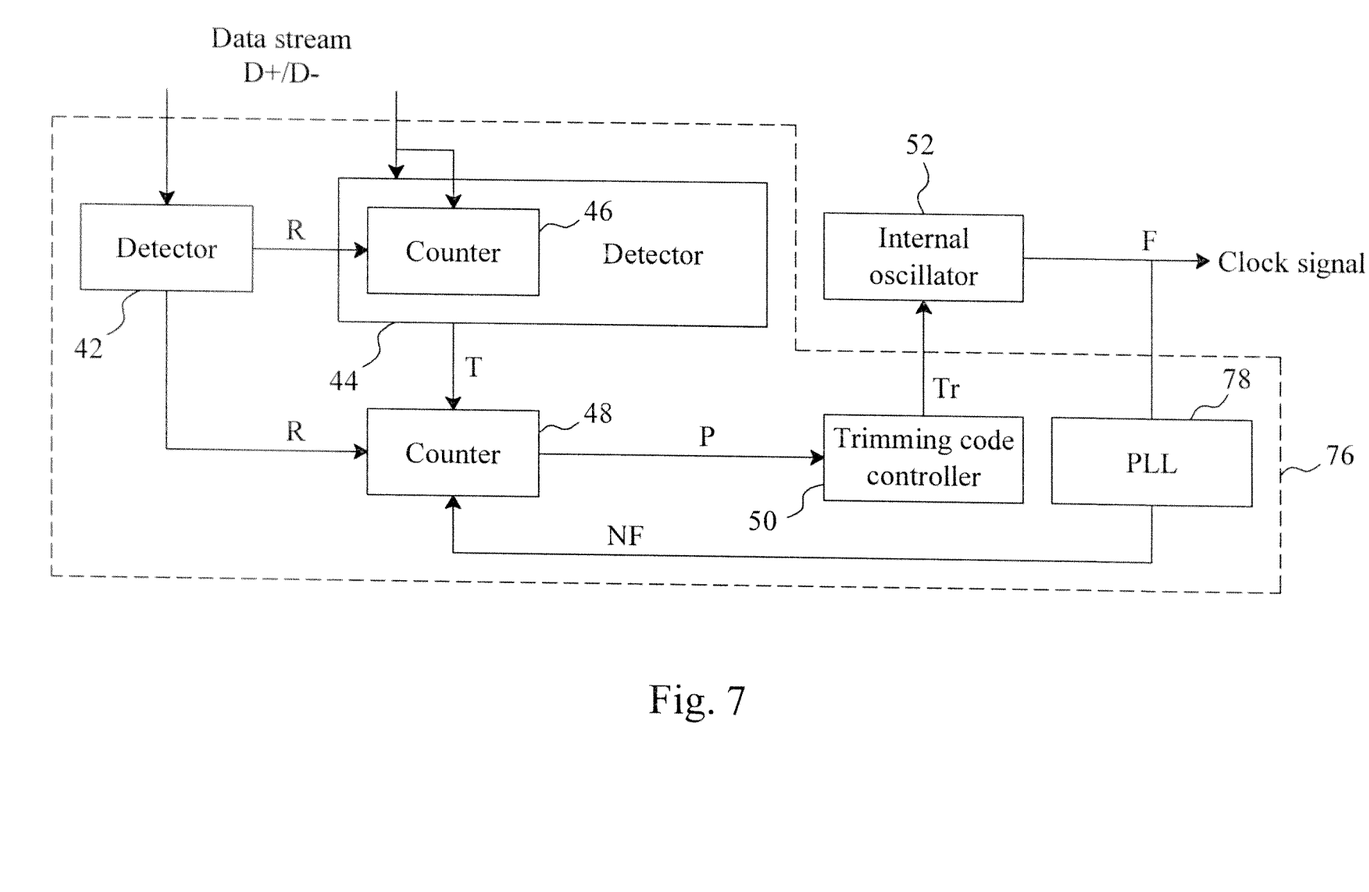
FIG. 7 is a circuit diagram of a second embodiment according to the present invention.

As shown in FIGS. 6 and 7, in another embodiment, a flowchart 50 of a method for trimming an internal oscillator of a USB device further includes frequency multiplication step 74, and for which, a circuit 76 further includes a phase lock loop (PLL) 78 coupled to the internal oscillator 52 to multiply the clock frequency F of the internal oscillator 52 to NF for the counter 48 to carry out clock counting thereon, where N is a multiplication factor. Thus, a low-frequency RC oscillator can be used as the internal oscillator 52 to meet the requirements of high frequency applications. For example, if the USB device requires a frequency of 12 MHz, the internal oscillator 52 can be a 500 KHz RC oscillator while a phase lock loop 78 whose multiplication factor N is 24 is used for frequency multiplication, thereby generating a clock signal with a frequency of 12 MHz. In operation, the accuracy on the clock frequency of the low-frequency RC oscillator is first trimmed to within ±0.25%, and then the clock frequency of the low-frequency RC oscillator is multiplied by the phase lock loop 78 to the desired frequency. Since the specification of the host clock rate in full-speed USB host is ±2,500 ppm (i.e., ±0.25%), the accuracy on the clock frequency of the internal oscillator of the USB device is trimmed to within ±0.25%. By contrast, the frequency jitter of a common high-frequency RC oscillator, such as a 24 MHz or 48 MHz RC oscillator, is larger than ±0.25% on the clock frequency of the common high-frequency RC oscillator. In this embodiment, the phase lock loop 78 is used to multiply the clock frequency of a low-frequency RC oscillator and thereby satisfy high-frequency requirements. The phase lock loop 78 has a relatively small frequency jitter and can therefore solve the problem that the clock frequency of the internal oscillator 52 fails to trim to the specified accuracy due to an excessively large frequency jitter of a high-frequency RC oscillator used as the internal oscillator 52. In addition, using a low-frequency RC oscillator as the internal oscillator 52 also further simplifies circuit and saves costs.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method for trimming an internal oscillator of a USB device that generates a clock signal as a frequency source of the USB device, the method comprising the steps of:
   (a) detecting an end of packet from an input data stream for initializing a counter;
   (b) detecting an input packet in the data stream for identifying whether or not the input packet is a token packet, and if the input packet is not a token packet, going back to the step (a), otherwise proceeding with the following steps;
   (c) identifying whether or not the input packet has a packet identifier which defines a start of frame token packet, and if the input packet is a start of frame token packet, sequentially controlling the counter to carry out clock counting on the clock signal, otherwise going back to the step (a);
   (d) detecting a next start of frame token packet in the data stream for latching the counter to thereby obtain a count value; and
   (e) comparing the count value with a reference value for trimming a clock frequency of the internal oscillator;
   wherein said count value is obtained responsive solely to a determination of whether the input packet is a start of frame packet, and the step (b) comprises the steps of:
   counting the number of clocks in the clock signal during an interval between a first rising edge and a third rising edge of a positive differential signal carrying the data stream for generating a first clock count value;
   counting the number of clocks in the clock signal during an interval between the first rising edge and a fourth rising edge of the positive differential signal for generating a second clock count value; and
   if the first clock count value is one-half of the second clock count value, concluding the input packet as a token packet.

2. The method of claim 1, wherein the step (c) comprises the steps of:
   latching the first to fourth bits following the fourth rising edge of the positive differential signal for extracting a packet identifier; and
   if the positive differential signal is "1101" in the packet identifier, concluding the input packet as a start of frame token packet.

3. The method of claim 1, wherein the step (d) comprises the steps of:
   (f) detecting a next input packet in the data stream;
   (g) identifying whether or not the next input packet is a second token packet, and if the next input packet is not a second token packet, going back to the step (f), otherwise preceding the following steps; and
   (h) identifying whether or not the next input packet is a next start of frame token packet, and if the next input packet is a next start of frame token packet, latching the counter to thereby obtain the count value, otherwise going back to the step (f).

4. The method of claim 3, wherein the step (g) comprises the steps of:
   counting the number of clocks in the clock signal during an interval between a next first rising edge and a next third rising edge of the positive differential signal carrying the data stream for generating a third clock count value;

counting the number of cocks in the clock signal during an interval between the next first rising edge and a next fourth rising edge of the positive differential signal for generating a fourth clock count value; and if the third clock count value is one-half of the fourth clock count value, concluding the next input packet as a second token packet.

5. The method of claim 4, wherein the step (h) comprises the steps of:

latching the first to fourth bits following the next fourth rising edge of the positive differential signal for extracting a packet identifier; and if the positive differential signal is "1101" in the packet identifier, concluding the next input packet as a next start of frame token packet.

6. The method of claim 3, wherein the step (g) comprises the steps of:

counting the number of clocks in the clock signal during an interval between a first falling edge and a third falling edge of a negative differential signal carrying the data stream for generating a third clock count value;

counting the number of clocks in the clock signal during an interval between the first falling edge and a fourth falling edge of the negative differential signal for generating a fourth clock count value; and if the third clock count value is one-half of the fourth clock count value, concluding the next input packet as a second token packet.

7. The method of claim 6, wherein the step (h) comprises the steps of:

latching the first to fourth bits following the fourth falling edge of the negative differential signal for extracting a packet identifier; and if the negative differential signal is "0010" in the packet identifier, concluding the next input packet as a next start of frame token packet.

8. The method of claim 1, wherein the step (e) comprises the steps of:

decreasing the clock frequency of the internal oscillator when the count value is greater than the reference value; and increasing the clock frequency of the internal oscillator when the count value is smaller than the reference value.

9. The method of claim 1, further comprising the step of multiplying the clock frequency of the internal oscillator for the counter to carry out clock counting.

10. A method for trimming an internal oscillator of a USB device that generates a clock signal as a frequency source of the USB device, the method comprising the steps of:

(a) detecting an end of packet from an input data stream for initializing a counter;

(b) detecting an input packet in the data stream for identifying whether or not the input packet is a token packet, and if the input packet is not a token packet, going back to step (a), otherwise proceeding with the following steps;

(c) identifying whether or not the input packet has a packet identifier which defines a start of frame token packet, and if the input packet is a start of frame token packet, sequentially controlling the counter to carry out clock counting on the clock signal, otherwise going back to the step (a);

(d) detecting a next start of frame token packet in the data stream for latching the counter to thereby obtain a count value; and (e) comparing the count value with a reference value for trimming a clock frequency of the internal oscillator;

wherein said count value is obtained responsive solely to a determination of whether the input packet is a start of frame packet, and the step (b) comprises the steps of:

counting the number of clocks in the clock signal during an interval between a first falling edge and a third falling edge of a negative differential signal carrying the data stream for generating a first clock count value;

counting the number of clocks in the clock signal during an interval between the first falling edge and a fourth falling edge of the negative differential signal for generating a second clock count value; and if the first clock count value is one-half of the second clock count value, concluding the input packet as a token packet.

11. The method of claim 10, wherein the step (c) comprises the steps of:

latching the first to fourth bits following the fourth falling edge of the negative differential signal for extracting a packet identifier; and if the negative differential signal is "0010" in the packet identifier, concluding the input packet as a start of frame token packet.

12. The method of claim 10, wherein the step (d) comprises the steps of:

(f) detecting a next input packet in the data stream;

(g) identifying whether or not the next input packet is a second token packet, and if the next input packet is not a second token packet, going back to the step (f), otherwise preceding the following steps; and (h) identifying whether or not the next input packet is a next start of frame token packet, and if the next input packet is a next start of frame token packet, latching the counter to thereby obtain the count value, otherwise going back to the step (f).

13. The method of claim 12, wherein the step (g) comprises the steps of:

counting the number of clocks in the clock signal during an interval between a first rising edge and a third rising edge of a positive differential signal carrying the data stream for generating a third clock count value;

counting the number of cocks in the clock signal during an interval between the first rising edge and a fourth rising edge of the positive differential signal for generating a fourth clock count value; and if the third clock count value is one-half of the fourth clock count value, concluding the next input packet as a second token packet.

14. The method of claim 13, wherein the step (h) comprises the steps of:

latching the first to fourth bits following the fourth rising edge of the positive differential signal for extracting a packet identifier; and if the positive differential signal is "1101" in the packet identifier, concluding the next input packet as a next start of frame token packet.

15. The method of claim 12, wherein the step (g) comprises the steps of:

counting the number of clocks in the clock signal during an interval between a next first falling edge and a next third falling edge of the negative differential signal carrying the data stream for generating a third clock count value;

counting the number of clocks in the clock signal during an interval between the next first falling edge and a next fourth falling edge of the negative differential signal for generating a fourth clock count value; and if the third clock count value is one-half of the fourth clock count value, concluding the next input packet as a second token packet.

16. The method of claim 15, wherein the step (h) comprises the steps of:
latching the first to fourth bits following the next fourth falling edge of the negative differential signal for extracting a packet identifier; and
if the negative differential signal is "0010" in the packet identifier, concluding the next input packet as a next start of frame token packet.

17. The method of claim 10, wherein the step (e) comprises the steps of:
decreasing the clock frequency of the internal oscillator when the count value is greater than the reference value; and
increasing the clock frequency of the internal oscillator when the count value is smaller than the reference value.

18. The method of claim 10, further comprising the step of multiplying the clock frequency of the internal oscillator for the counter to carry out clock counting.

19. A circuit for trimming an internal oscillator of a USB device that generates a clock signal as a frequency source of the USB device, the circuit comprising:
a first counter;
a first detector coupled to the first counter, operative to detect an end of packet from an input data stream to initialize the first counter;
a second detector coupled to the first counter, operative to detect a token packet in the data stream to identify a start of frame token packet in the data stream to generate a counting signal for triggering the first counter to carry out clock counting on the clock signal, and to detect a next start of frame token packet in the data stream to turn off the counting signal for latching the counter to obtain a count value; and
a trimming code controller coupled between the first counter and the internal oscillator, operative to compare the count value with a reference value to determine a trimming code for trimming a clock frequency of the internal oscillator;
wherein said second detector detects the first to fourth rising edges of a positive differential signal carrying the data stream, comprises a second counter for counting the number of clocks in the clock signal during an interval between the first rising edge and the third rising edge of the positive differential signal to generate a first clock count value, and counting the number of clocks in the clock signal during an interval between the first rising edge and the fourth rising edge of the positive differential signal to generate a second clock count value, and concludes an input packet in the data stream as the token packet if the first clock count value is one-half of the second clock count value, and said count value is obtained responsive solely to a determination of whether the input packet is a start of frame packet.

20. The circuit of claim 19, wherein the fourth rising edge of the positive differential signal is used to extract a packet identifier for identifying the start of frame token packet.

21. The circuit of claim 20, wherein the packet identifier contains the first to fourth bits following the fourth rising edge.

22. The circuit of claim 19, further comprising a phase lock loop coupled to the internal oscillator, operative to multiply the clock frequency of the internal oscillator for the counter to carry out clock counting.

23. A circuit for trimming an internal oscillator of a USB device that generates a clock signal as a frequency source of the USB device, the circuit comprising:
a first counter;
a first detector coupled to the first counter, operative to detect an end of packet from an input data stream to initialize the first counter;
a second detector coupled to the first counter, operative to detect a token packet in the data stream to identify a start of frame token packet in the data stream to generate a counting signal for triggering the first counter to carry out clock counting on the clock signal, and to detect a next start of frame token packet in the data stream to turn off the counting signal for latching the counter to obtain a count value; and
a trimming code controller coupled between the first counter and the internal oscillator, operative to compare the count value with a reference value to determine a trimming code for trimming a clock frequency of the internal oscillator;
wherein the second detector detects the first to fourth falling edges of a negative differential signal carrying the data stream, comprises a second counter for counting the number of clocks in the clock signal during an interval between the first falling edge and the third falling edge of the negative differential signal to generate a first clock count value, and counting the number of clocks in the clock signal during an interval between the first falling edge and the fourth falling edge of the negative differential signal to generate a second clock count value, and concludes an input packet in the data stream as the token packet if the first clock count value is one-half of the second clock count value, and said count value is obtained responsive solely to a determination of whether the input packet is a start of frame packet.

24. The circuit of claim 23, wherein the fourth falling edge of the negative differential signal is used to extract a packet identifier for identifying the start of frame token packet.

25. The circuit of claim 24, wherein the packet identifier contains the first to fourth bits following the fourth falling edge.

26. The circuit of claim 23, further comprising a phase lock loop coupled to the internal oscillator, operative to multiply the clock frequency of the internal oscillator for the counter to carry out clock counting.

* * * * *